US010845556B2

(12) United States Patent
Sato et al.

(10) Patent No.: US 10,845,556 B2
(45) Date of Patent: Nov. 24, 2020

(54) OPTICAL FIBER CABLE

(71) Applicant: SUMITOMO ELECTRIC INDUSTRIES, LTD., Osaka (JP)

(72) Inventors: Fumiaki Sato, Yokohama (JP); Taro Fujita, Osaka (JP); Nayu Yanagawa, Osaka (JP); Yoshiaki Nagao, Yokohama (JP); Nobuyuki Suzuki, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 54 days.

(21) Appl. No.: 16/309,217

(22) PCT Filed: Aug. 8, 2017

(86) PCT No.: PCT/JP2017/028684
§ 371 (c)(1),
(2) Date: Dec. 12, 2018

(87) PCT Pub. No.: WO2017/217559
PCT Pub. Date: Dec. 21, 2017

(65) Prior Publication Data
US 2020/0183111 A1 Jun. 11, 2020

(30) Foreign Application Priority Data
Jun. 13, 2016 (JP) .................... 2016-117101

(51) Int. Cl.
*G02B 6/44* (2006.01)
(52) U.S. Cl.
CPC .................. *G02B 6/4403* (2013.01)

(58) Field of Classification Search
CPC .. G02B 6/4403; G02B 6/4433; G02B 6/4494; G02B 6/4429; G02B 6/44
See application file for complete search history.

(56) References Cited

U.S. PATENT DOCUMENTS

| 6,052,502 A * | 4/2000 | Coleman .............. G02B 6/4407 385/100 |
| 2016/0161692 A1* | 6/2016 | Namazue ............. G02B 6/4403 385/114 |

FOREIGN PATENT DOCUMENTS

| JP | 2004-184917 A | 7/2004 |
| JP | 2013-80113 A | 5/2013 |
| JP | 2013-88617 A | 5/2013 |
| JP | 2014-164014 A | 9/2014 |
| JP | 2016-20990 A | 2/2016 |

* cited by examiner

*Primary Examiner* — Jennifer Doan
(74) *Attorney, Agent, or Firm* — Faegre Drinker Biddle & Reath LLP

(57) ABSTRACT

An optical fiber cable includes optical fiber ribbons, a slot rod and a cable jacket. The slot rod has slot grooves in which the optical fiber ribbons are housed. The cable jacket covers an outside of the slot rod. The optical fiber ribbons have, in a state in which optical fibers having an outer diameter of 0.22 mm or less are arranged in parallel, connecting portions at which adjacent ones of the optical fibers are connected to one another and non-connecting portions at which adjacent ones of the optical fibers are not connected to one another, which are provided intermittently in a longitudinal direction. A density of core number of the optical fibers included in the optical fiber cable is 4.8 cores/mm$^2$ or more in a cross section of the optical fiber cable.

4 Claims, 5 Drawing Sheets

OPTICAL FIBER CABLE

TECHNICAL FIELD

The present invention relates to an optical fiber cable.

This application claims priority based on Japanese Patent Application Number 2016-117101, filed Jun. 13, 2016, the full disclosure of which is incorporated herein.

There has been known a slot type optical fiber cable including a slot rod having a plurality of slot grooves, in which optical fiber ribbons are housed in the slot grooves. For example, Patent Document 1 describes a slot type optical fiber cable in which optical fiber ribbons are housed in slot grooves, the optical fiber ribbons respectively having connecting portions provided intermittently in a ribbon longitudinal direction and a ribbon width direction.

CITATION LIST

Patent Literature

[Patent Document 1] JP-A-2013-88617

SUMMARY OF INVENTION

An optical fiber cable according to an aspect of the present disclosure is an optical fiber cable comprising:

optical fiber ribbons;

a slot rod having a plurality of slot grooves in which the optical fiber ribbons are housed; and a cable jacket covering an outside of the slot rod, wherein the optical fiber ribbons respectively have, in a state in which a plurality of optical fibers having an outer diameter of 0.22 mm or less are arranged in parallel, connecting portions at which adjacent ones of the optical fibers are connected to one another and non-connecting portions at which adjacent ones of the optical fibers are not connected to one another, which are provided intermittently in a longitudinal direction between some of or all of the optical fibers, and a density of core number of the optical fibers included in the optical fiber cable is 4.8 cores/mm$^2$ or more in a cross section of the optical fiber cable.

DESCRIPTION OF EMBODIMENTS

Figure 1:
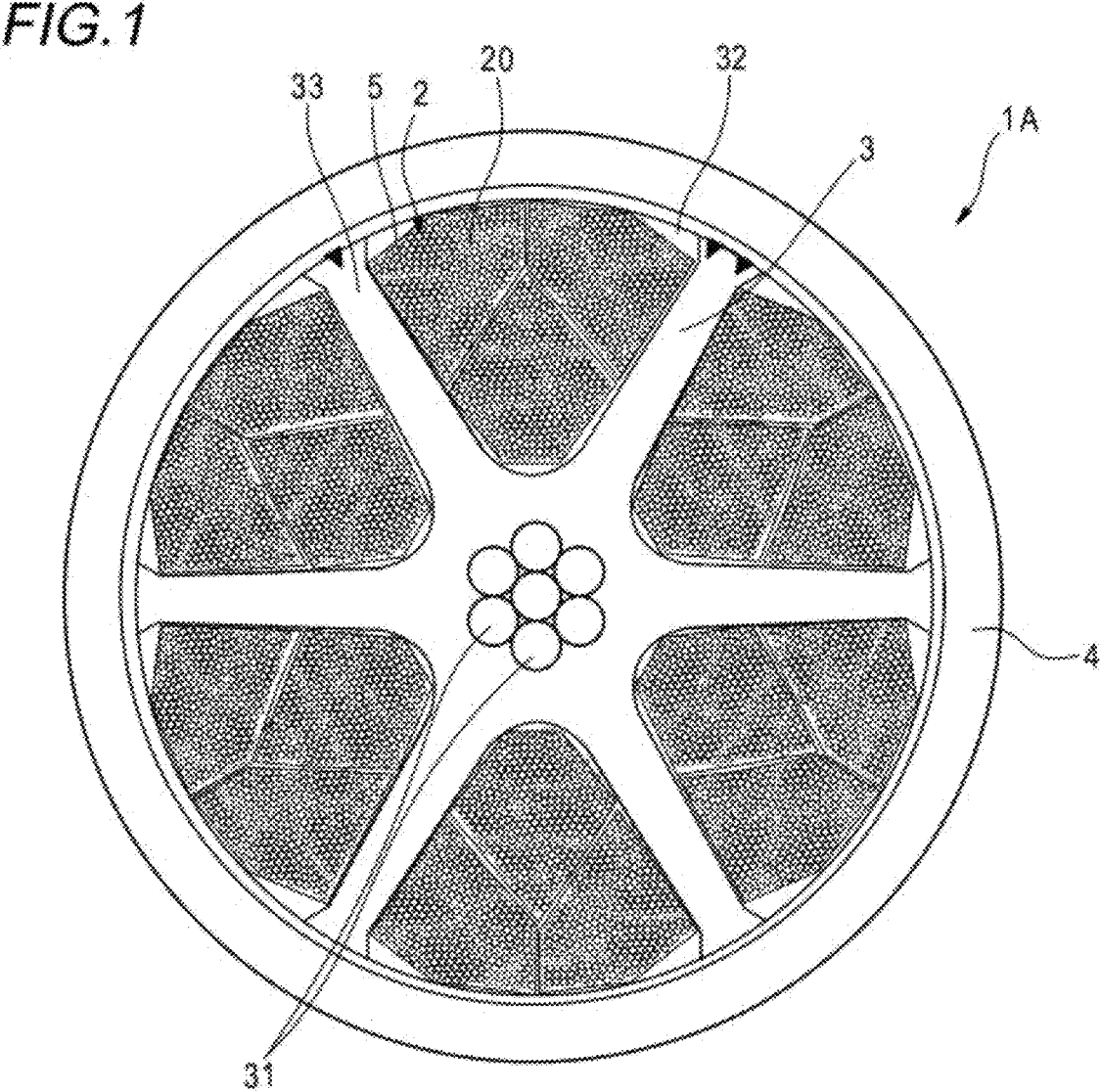
FIG. 1 is a cross-sectional view of an optical fiber cable according to a first embodiment.

Problems to be Solved by the Invention

In a slot type optical fiber cable, since optical fiber ribbons can be taken out from each slot groove, identification performance of optical fiber ribbons is excellent. However, since a member forming a slot rod occupies space in the cable, it is difficult to achieve high density.

The present disclosure aims to provide an optical fiber cable in which optical fibers can be mounted densely in a slot type multi-core optical fiber cable.

Effect of Invention

According to the present disclosure, optical fibers can be mounted densely in a slot type multi-core optical fiber cable.

Description of Embodiment of Invention

First, embodiments of the present invention will be listed and described.

An optical fiber cable includes:

optical fiber ribbons;

a slot rod having a plurality of slot grooves in which the optical fiber ribbons are housed; and a cable jacket covering an outside of the slot rod, the optical fiber ribbons respectively have, in a state in which a plurality of optical fibers having an outer diameter of 0.22 mm or less are arranged in parallel, connecting portions at which adjacent ones of the optical fibers are connected to one another and non-connecting portions at which adjacent ones of the optical fibers are not connected to one another, and the connecting portions and the non-connecting portions are provided intermittently in a longitudinal direction between a part of or all of the optical fibers, and a density of core number of the optical fibers included in the optical fiber cable is 4.8 cores/mm$^2$ or more in a cross section of the optical fiber cable.

According to this configuration, the optical fiber ribbon is an intermittent connection type in which a plurality of optical fibers having an outer dimension of 0.22 mm or less are arranged in parallel, and connecting portions and non-connecting portions are intermittently provided between the optical fibers. Therefore, by housing such intermittent connection type optical fiber ribbons in the slot grooves, the density of core number of the optical fibers included in the optical fiber cable can be 4.8 cores/mm$^2$ or more. Therefore, in the slot type multi-core optical fiber cable, the optical fibers can be mounted densely.

(2) The optical fiber cable preferably has an outer diameter of 35 mm or less, and a core number of the optical fibers housed in one of the slot grooves is preferably 100 or more.

By setting the number of optical fibers housed in one of the slot grooves to 100 or more even when the outer diameter of the slot type optical fiber cable is 35 mm or less, the optical fibers can be mounted densely.

(3) An outermost layer of the slot rod is preferably constituted by a resin having a Young's modulus of 1500 MPa or more at normal temperature.

By constituting the outermost layer of the slot rod by a resin having a Young's modulus of 1500 MPa or more at normal temperature, slot ribs can be thinned, and thus it is possible to increase a cross-sectional area of the slot grooves and to densely mount the optical fibers.

(4) A surface roughness Ra of the slot grooves is preferably 5 μm or less.

When the surface roughness of the slot grooves is more than 5 μm, a transmission loss of the optical fibers tends to deteriorate, and thus the surface roughness of the slot groove is preferably 5 μm or less.

(5) A distance between centers of adjacent ones of the optical fibers is preferably 0.20±0.03 mm.

When the distance between the centers of adjacent ones of the optical fibers is 0.20±0.03 mm in the optical fiber ribbons, the optical fibers can be mounted more densely.

(6) A Young's modulus of a primary resin of the optical fibers at room temperature is preferably 0.5 MPa or more and 1.5 MPa or less.

When the Young's modulus at room temperature of the primary resin of the optical fiber exceeds 1.5 MPa, the transmission loss of the optical fiber tends to deteriorate. On the other hand, when the Young's modulus is excessively low, and when a stress is applied to the optical fibers, there is a concern that internal resin is broken and voids and the like are likely to occur, and thus the lower limit is preferably 0.5 MPa or more. Therefore, the Young's modulus is preferably 0.5 MPa or more and 1.5 MPa or less.

Details of Embodiment of Invention

A specific example of an optical fiber cable according to an embodiment of the present invention will be described below with reference to the drawings.

The present invention is not limited to these examples, and is intended to include all modifications within the meaning and scope equivalent to the terms of the claims.

FIG. 1 is a cross-sectional view showing a configuration of an optical fiber cable 1A according to a first embodiment.

The optical fiber cable 1A includes an optical unit 2 which is an assembly of optical fiber ribbons 20, a slot rod 3 housing the optical unit 2, and a cable jacket 4 covering the outside of the slot rod 3.

In the slot rod 3, a plurality of (for example, seven) tension members 31 are embedded in a center portion, and a plurality of (for example, six) slot grooves 32 housing the optical unit 2 are formed on an outer peripheral surface.

The tension members 31 are formed of a wire material having a proof stress against tension and compression, such as a steel wire or a fiber-reinforced plastic wire. The tension members 31 are embedded along a longitudinal direction of the optical fiber cable 1A.

Six slot grooves 32 are formed in a spiral shape in one direction along the longitudinal direction of the optical fiber cable 1A. Each slot groove 32 is partitioned by slot ribs 33 extending radially from the periphery of the tension members 31. The slot grooves 32 are formed so as to have, for example, a substantially U-shaped cross section. The slot grooves 32 may be formed, for example, in an SZ shape. The surface roughness Ra of the slot grooves 32 is 5 µm or less. The surface roughness Ra can be adjusted by appropriately changing manufacturing conditions such as extrusion molding linear speed and production temperature of the slot.

The surface portion of the slot rod 3 is formed of a resin having a Young's modulus at normal temperature of 1500 MPa or more, for example, engineering plastic. The surface portion of the slot rod 3 may be formed of a material obtained by alloying a high Young's modulus material to a polyethylene of an existing material (for example, polyethylene and silicone, polyethylene and nylon, or the like) in order to secure a certain degree of flexibility.

The optical unit 2 is formed of a plurality of (for example, twelve) optical fiber ribbons 20. Each optical fiber ribbon 20 of the optical unit 2 is, for example, an assembly obtained by being twisted in a spiral shape in one direction. The twisted twelve optical fiber ribbons 20 may be, for example, bundled by a bundling member 5 for identification which is formed of a resin tape such as polyester. Each of the optical fiber ribbons 20 may be twisted in an SZ shape such as a spiral shape that is periodically inverted, or may be housed in a stacked state. The optical unit 2 is housed in the slot grooves 32 along the longitudinal direction of the optical fiber cable 1A. For example, three optical units 2 are housed in each slot groove 32.

Figure 2:
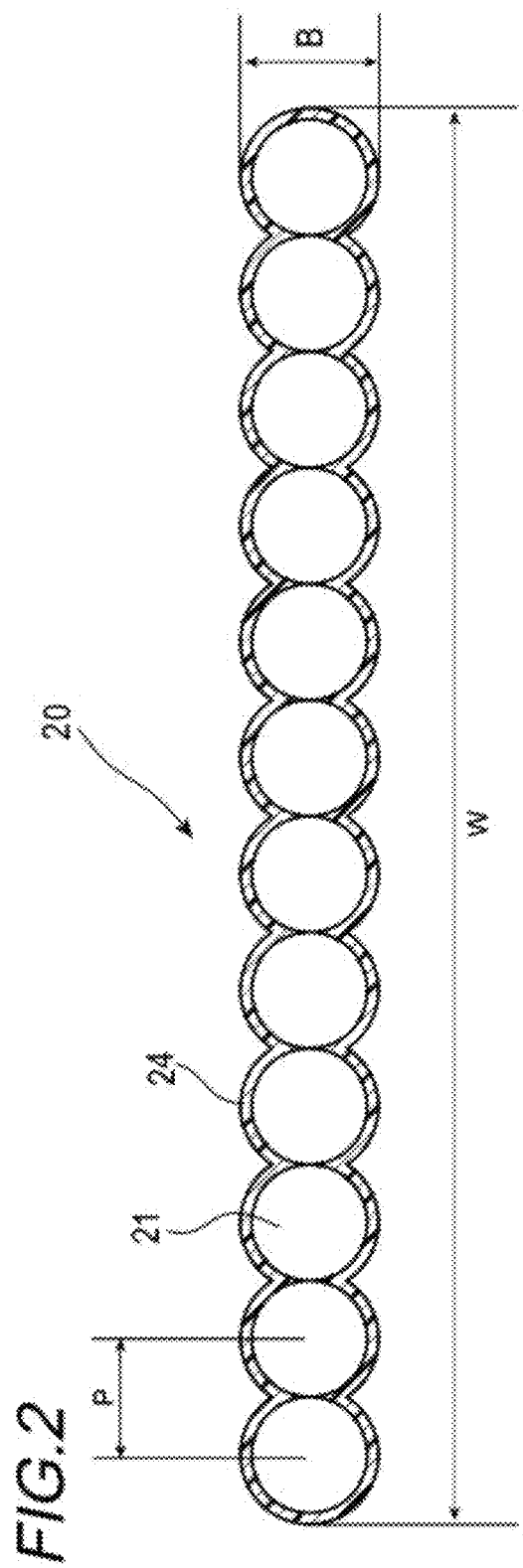
FIG. 2 is a cross-sectional view showing an example of an optical fiber ribbon.
Figure 3:
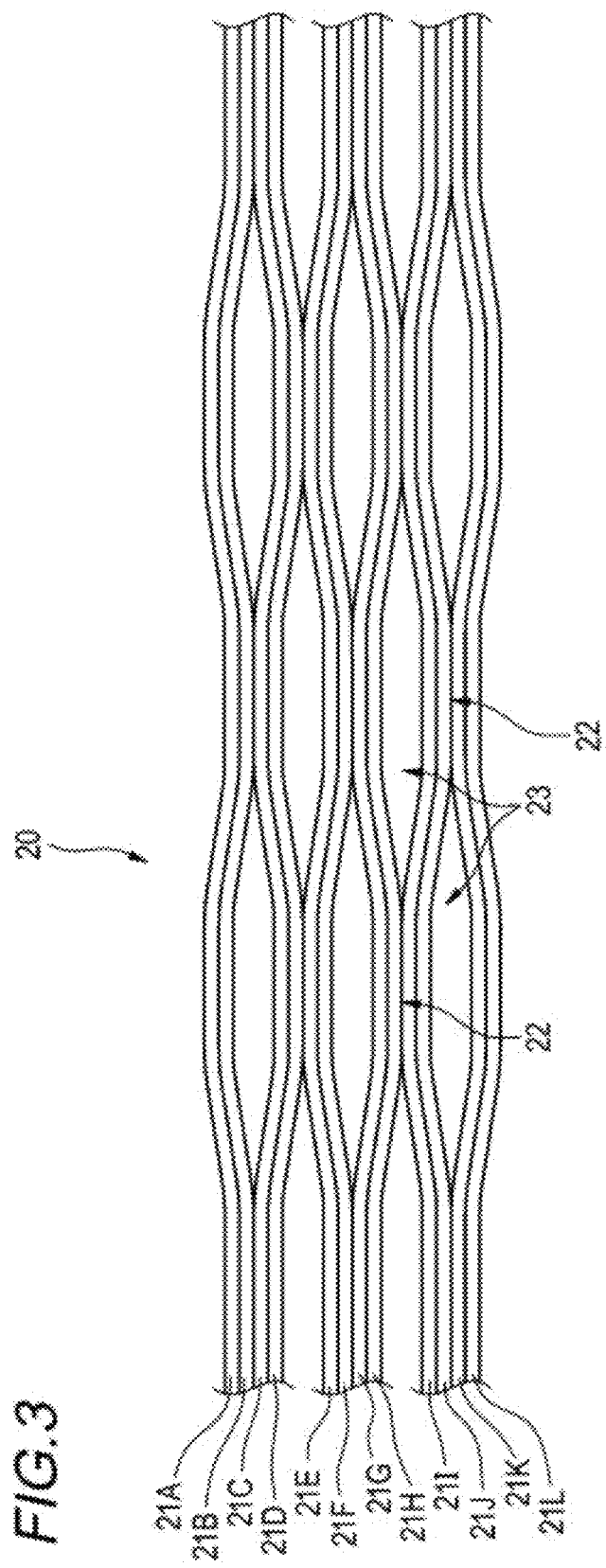
FIG. 3 is a top view showing a state in which non-connecting portions of the optical fiber ribbon are expanded in parallel.

As shown in FIG. 2 and FIG. 3, the optical fiber ribbon 20 includes a plurality of (for example, twelve) optical fibers 21A to 21L arranged in parallel (hereinafter collectively referred to as optical fibers 21). A tape coating 24 formed of an ultraviolet curable resin or the like is provided around the parallel optical fibers 21, and the twelve optical fibers 21 are integrated by the tape coating 24. The optical fiber ribbon 20 is formed so as to have, for example, a thickness B of 0.23 mm or less, a distance P between centers of adjacent ones of the optical fibers 21 of 0.20±0.03 mm, and, as for the case of twelve cores, a width W of 2.5 mm or less.

The optical fiber ribbon 20 is an intermittent connection type optical fiber ribbon, and has connecting portions 22 at which adjacent ones of the optical fibers 21 are connected to one another and non-connecting portions 23 at which adjacent ones of the optical fibers 21 are not connected to one another, which are provided intermittently in the longitudinal direction. Locations at which the connecting portions 22 and the non-connecting portions 23 are provided may be either between all of the optical fibers or between some of the optical fibers.

For example, the optical fiber ribbon 20 shown in FIG. 3 is an optical fiber ribbon of a two-core intermittent type in which the connecting portions 22 and the non-connecting portions 23 are intermittently provided with two optical fibers 21 as a unit. That is, in the twelve optical fibers 21A to 21L, the optical fiber ribbon 20 does not have the non-connecting portions 23 provided between the optical fibers 21A and 21B, 21C and 21D, 21E and 21F, 21G and 21H, 21I and 21J, and 21K and 21L.

Figure 4:
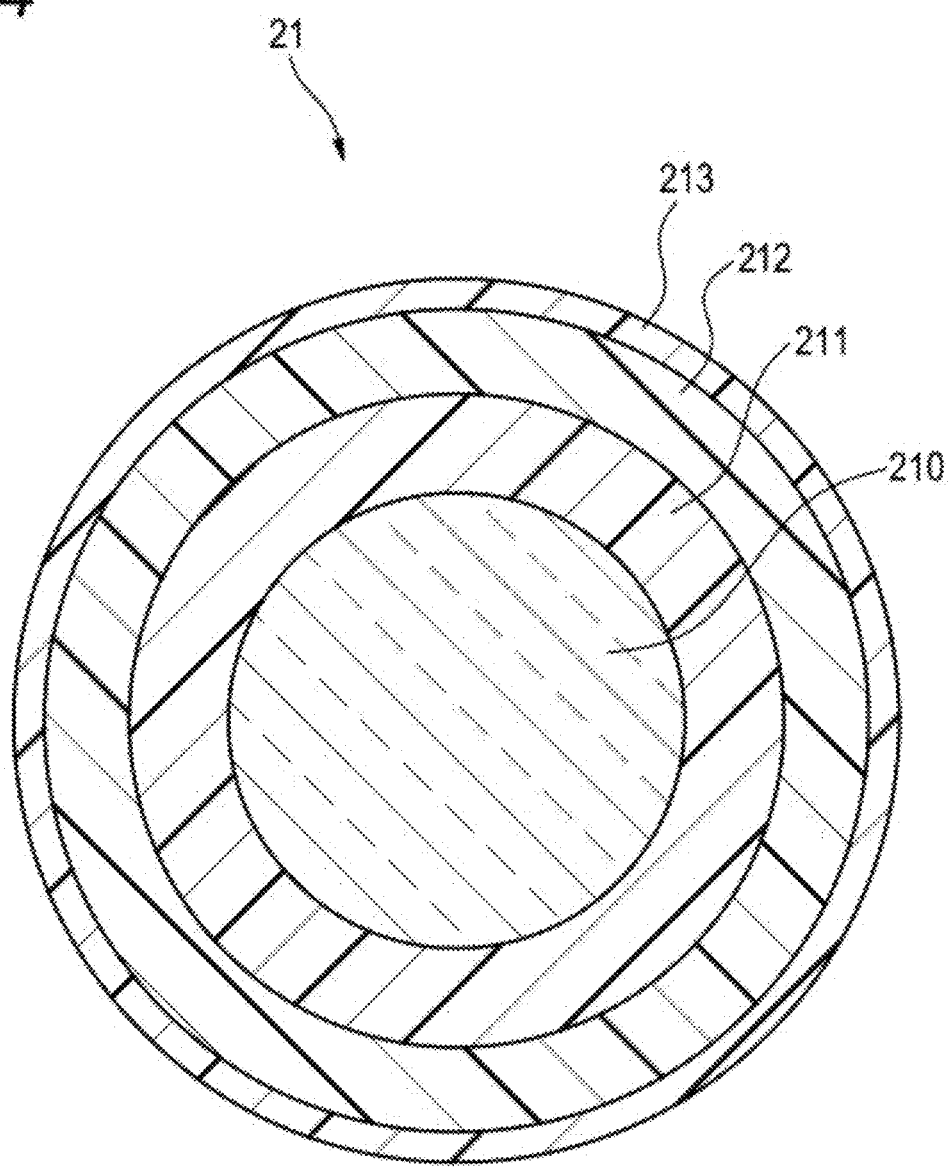
FIG. 4 is a cross-sectional view of one optical fiber.

As shown in FIG. 4, the optical fiber 21 includes an optical fiber 210 at a central portion thereof. The optical fiber 210 is constituted by, for example, silica glass or plastic, and is formed so as to have an outer diameter of, for example, 0.125 mm. Although not shown, the optical fiber 210 includes a core and a cladding. The core is disposed at a radial center. The cladding covers the periphery of the core.

The optical fiber 21 includes a primary coating 211 (an example of the primary resin) covering the optical fiber 210, a secondary coating 212 covering the primary coating 211, and a colored layer 213 covering the periphery of the secondary coating 212. The optical fiber 21 has an outer diameter of 0.22 mm or less.

The primary coating 211 is formed of, for example, an ultraviolet curable resin having a Young's modulus of 0.5 MPa or more and 1.5 MPa or less at room temperature. The secondary coating 212 is formed of an ultraviolet curable resin harder than the primary coating 211, and is formed so as to have an outer diameter of, for example, 0.2 mm. The colored layer 213 is formed so as to have a predetermined color in order to identify the plurality of optical fibers 21. The colored layer 213 is formed of an ultraviolet curable resin and is formed so as to have an outer diameter of, for example, 0.205 mm or less, which is less than 0.22 mm.

The optical fiber cable constituted by such elements has an outer diameter of 35 mm or less, and is formed such that the number of the optical fibers 21 housed in one slot groove 32 is 100 or more. The density of core number of the optical fibers 21 included in the optical fiber cable is 4.8 cores/mm$^2$ or more in the cross section of the optical fiber cable.

Specifically, the optical fiber cable 1A shown in FIG. 1 has an outer diameter of 26 mm, and a core number of optical fibers 21 is 144 in one optical unit 2 housed in one slot groove 32. Since three optical units 2 are respectively housed in each of the six slot grooves 32, the core number of all of the optical fibers is 2592, and the density of core number of the optical fibers 21 included in the optical fiber cable 1A is 4.9 cores/mm$^2$.

The optical fiber cable 1A is manufactured as follows.

An optical fiber ribbon having a thickness B of 0.23 mm or less and a width W of 2.5 mm or less is manufactured by arranging twelve optical fibers 21 having an outer diameter of 0.205 mm in parallel and covering the outer periphery thereof with a tape coating 24. An intermittent connection type optical fiber ribbon 20 is manufactured by inserting a notch between predetermined fibers in the optical fiber ribbon. As a method of manufacturing the intermittent connection type optical fiber ribbon 20, a connecting resin such as an ultraviolet curable resin may be intermittently applied between the optical fibers arranged in parallel so as to form the connecting portions 22 and the non-connecting portions 23.

An optical unit 2 is prepared by twisting twelve optical fiber ribbons 20, and three optical units 2 are respectively housed in each slot groove 32 of a slot rod 3. The outer side of the slot rod 3 housing the optical unit 2 is covered with the cable jacket 4 so as to complete manufacture of the optical fiber cable 1A.

As described above, according to the optical fiber cable 1A of the first embodiment, the optical fiber ribbons 20 are intermittent connection type optical fiber ribbons in which the connecting portions 22 and the non-connecting portions 23 are intermittently provided in the longitudinal direction between adjacent optical fibers 21. An outer dimension of the plurality of optical fibers 21 constituting the optical fiber ribbons 20 is 0.22 mm or less. Therefore, by combining a plurality of such intermittent connection type optical fiber ribbons 20 into the optical unit 2, the optical unit 2 can be combined without any gap, and the cross-sectional area of the optical unit 2 can be reduced. Therefore, by housing the optical unit 2 in the slot grooves 32, the density of core number of the optical fibers 21 included in the optical fiber cable 1A can be set to 4.8 cores/mm$^2$ or more. Therefore, the optical fibers 21 can be mounted densely in a slot type multi-core optical fiber cable with excellent identification of the optical fiber ribbons 20.

In addition, since a plurality of intermittent connection type optical fiber ribbons 20 are collectively housed in the slot grooves 32, even when the outer diameter of the optical fiber cable 1A is 35 mm or less, the core number of the optical fibers 21 housed in one slot groove 32 can be set to 100 or more. Accordingly, the optical fibers 21 can be mounted densely in the slot type multi-core optical fiber cable.

In addition, by forming the surface portion of the slot rod 3 with a resin having a Young's modulus at normal temperature of 1500 MPa or more, the slot ribs 33 partitioning the slot grooves 32 can be thinned. Therefore, the cross-sectional area of the slot grooves 32 in the optical fiber cable 1A can be increased, and the optical fibers 21 can be mounted densely.

Further, by setting the surface roughness Ra of the slot grooves 32 to 5 µm or less, it is possible to easily rotate the optical fibers 21 in the grooves and to suppress distortion which may occur to the optical fibers 21. Therefore, the optical fibers 21 can be mounted densely while suppressing deterioration of the transmission loss of the optical fiber 21.

Further, in the optical fiber ribbon 20, by suppressing the distance between the centers of adjacent optical fibers 21 to 0.20±0.03 mm, the optical fibers 21 can be mounted more densely.

Further, by setting the Young's modulus of the primary coating 211 in the optical fibers 21 at room temperature to 0.5 MPa or more, it is possible to suppress breakage of the internal resin due to stress application, and to suppress occurrence of voids and the like. Further, by setting the Young's modulus of the primary coating 211 in the optical fiber 21 at room temperature to 1.5 MPa or less, it is possible to suppress micro-bending loss and to suppress deterioration of the transmission loss.

Figure 5:
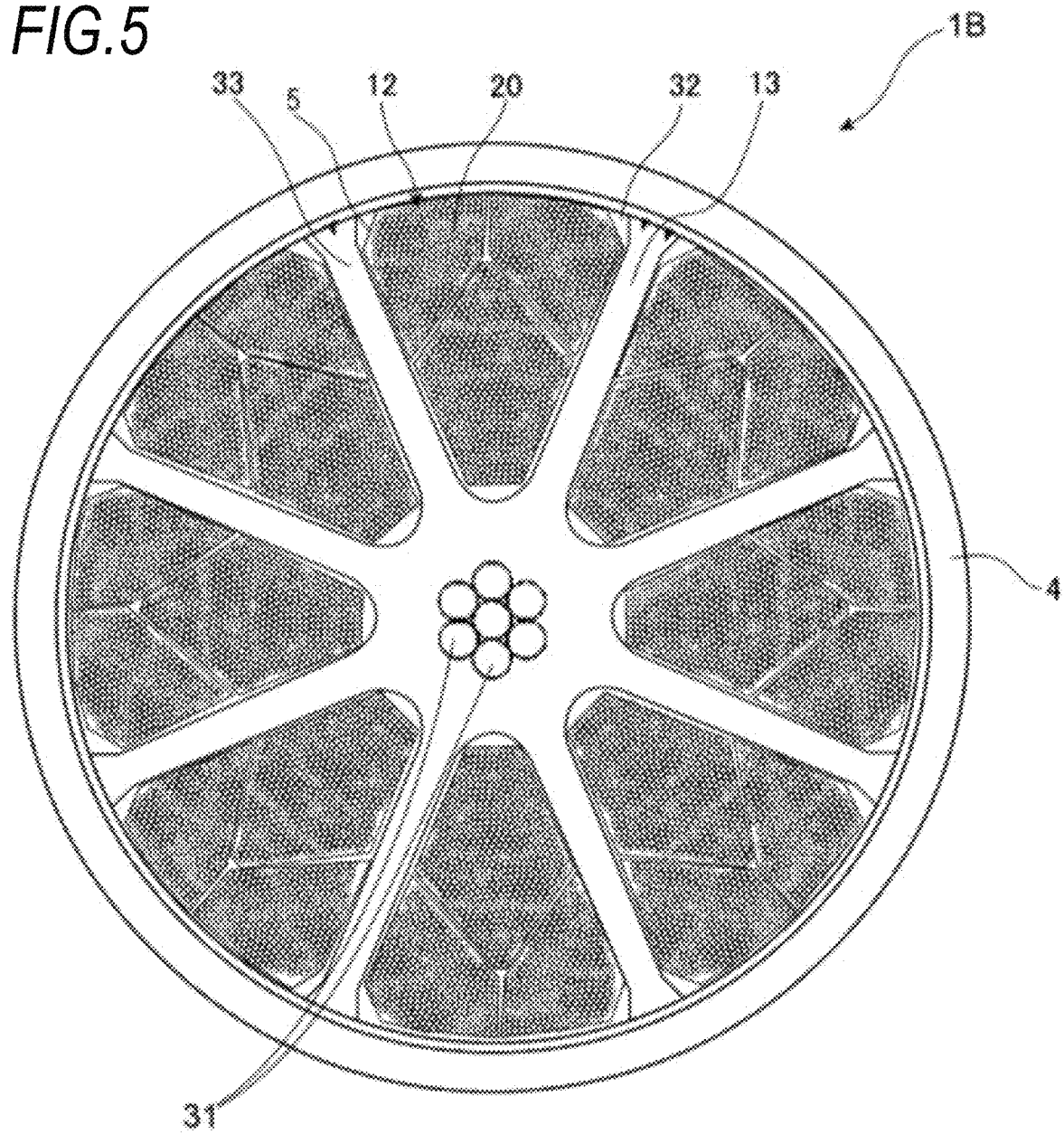
FIG. 5 is a cross-sectional view of an optical fiber cable according to a second embodiment.

FIG. 5 is a cross-sectional view showing a configuration of an optical fiber cable 1B according to a second embodiment.

As shown in FIG. 5, eight slot grooves 32 are formed in the slot rod 13 in an optical fiber cable 1B. The optical unit 12 housed in the slot grooves 32 is formed of a plurality of (for example, 16) optical fiber ribbons 20. The portions denoted by the same reference numerals as those of the optical fiber cable 1A of the first embodiment (see FIG. 1) are portions having the same function, and thus descriptions thereof are omitted.

The optical fiber cable 1B has an outer diameter of 35 mm, and the number of the optical fibers 21 in one optical unit 12 housed in one slot groove 32 is 192. Since three optical units 12 are respectively housed in each of the eight slot grooves 32, the core number of all of the optical fibers is 4608, and the density of core number of the optical fibers 21 included in the optical fiber cable 1B is 4.8 cores/mm$^2$.

The optical fiber cable 1B of the second embodiment having such configuration has the same advantages as the optical fiber cable 1A of the first embodiment.

Examples

A specific example of the optical fiber cable 1A according to the first embodiment will be described below.

When the optical fiber cable is manufactured, and when a material having a high Young's modulus is used as the material of the slot rod, although it is possible to thin the slot ribs and to increase the cross-sectional area of the slot grooves, there is a concern that the surface of the slot grooves becomes rough and the transmission loss of the optical fibers deteriorates. Further, in general, when the coating diameter of the optical fiber is reduced, there is a concern that influence of micro-bending loss increases and the transmission loss of the optical fiber deteriorate. Therefore, in the optical fiber cable 1A of the first embodiment in which a resin having a Young's modulus of 1500 MPa or more is used as the material of the slot rod 3 (13), and in which the outer diameter of the optical fibers 21 is 0.205 mm, the surface roughness Ra of the slot grooves 32 and the Young's modulus of the primary coating 211 (primary resin) are optimized.

The condition of the surface roughness Ra of the slot grooves 32 was changed to 0.05 µm to 10.00 µm, and the condition of the Young's modulus of the primary coating 211 in the optical fibers 21 was changed to 0.5 MPa to 2.5 MPa. A plurality of types of optical fiber cables were produced under combinations of the conditions, the transmission loss was measured, and the results are shown in Table 1. In judgment of the transmission loss, ones accepted (transmission loss ≤0.25 dB/km) are indicated by "A" and ones rejected (transmission loss >0.25 dB/km) are indicated by "R".

TABLE 1

| Slot surface roughness Ra (μm) | Young's modulus of primary resin of 0.20-mm core (MPa) | Transmission loss after cable manufacture (dB/km, λ = 1550 nm) | Judgment (transmission loss ≤0.25) |
|---|---|---|---|
| 0.05 | 0.5 | 0.190 | A |
| 0.05 | 1.5 | 0.190 | A |
| 0.05 | 2.5 | 0.190 | A |
| 0.10 | 0.5 | 0.190 | A |
| 0.10 | 1.5 | 0.190 | A |
| 0.10 | 2.5 | 0.190 | A |
| 0.20 | 0.5 | 0.190 | A |
| 0.20 | 1.5 | 0.190 | A |
| 0.20 | 2.5 | 0.198 | A |
| 0.50 | 0.5 | 0.190 | A |
| 0.50 | 1.5 | 0.193 | A |
| 0.50 | 2.5 | 0.203 | A |
| 1.00 | 0.5 | 0.190 | A |
| 1.00 | 1.5 | 0.193 | A |
| 1.00 | 2.5 | 0.225 | A |
| 2.00 | 0.5 | 0.191 | A |
| 2.00 | 1.5 | 0.195 | A |
| 2.00 | 2.5 | 0.250 | A |
| 5.00 | 0.5 | 0.195 | A |
| 5.00 | 1.5 | 0.220 | A |
| 5.00 | 2.5 | 0.320 | R |
| 10.00 | 0.5 | 0.260 | R |
| 10.00 | 1.5 | 0.320 | R |
| 10.00 | 2.5 | 0.500 | R |

As shown in Table 1, when the surface roughness Ra of the slot grooves 32 exceeded 5 μm and when the Young's modulus of the primary coating 211 exceeded 1.5 MPa, the value of the transmission loss tended to deteriorate. When Ra was 5 μm or more and the Young's modulus of the primary coating 211 exceeded 1.5 MPa, the transmission loss exceeded 0.25 dB/km, and the determination result was rejected. When the Young's modulus of the primary coating 211 is too low, and when a stress is generated in the optical fibers, the internal resin of the primary coating 211 is broken, and voids and the like are likely to occur. Therefore, the lower limit of the Young's modulus of the primary coating 211 is preferably 0.5 MPa or more.

From this result, it was found that the surface roughness Ra of the slot grooves 32 is preferably 5 μm or less, and the Young's modulus of the primary coating 211 is preferably 0.5 MPa or more and 1.5 MPa or less.

REFERENCE SIGNS LIST 1A, 1B optical fiber cable
2, 12 optical unit
3, 13 slot rod
4 cable jacket
5 bundling member
20 optical fiber ribbon
21 (21A to 21L) optical fiber
22 connecting portion
23 non-connecting portion
24 tape coating
31 tension member
32 slot groove
33 slot rib
210 optical fiber
211 primary coating (an example of primary resin))
212 secondary coating
213 colored layer

The invention claimed is:

1. An optical fiber cable comprising:
optical fiber ribbons;
a slot rod having a plurality of slot grooves in which the optical fiber ribbons are housed; and
a cable jacket covering an outside of the slot rod, wherein
the optical fiber ribbons respectively have, in a state in which a plurality of optical fibers having an outer diameter of 0.22 mm or less are arranged in parallel, connecting portions at which adjacent ones of the optical fibers are connected to one another and non-connecting portions at which adjacent ones of the optical fibers are not connected to one another, and the connecting portions and the non-connecting portions are provided intermittently in a longitudinal direction between a part of or all of the optical fibers,
a density of a core number of the optical fibers included in the optical fiber cable is 4.8 cores/mm$^2$ or more in a cross section of the optical fiber cable,
a surface roughness Ra of the slot grooves is 5 μm or less, and
a Young's modulus of a primary resin of the optical fibers at room temperature is 0.5 MPa or more and 1.5 MPa or less.

2. The optical fiber cable according to claim 1, wherein the optical fiber cable has an outer diameter of 35 mm or less, and a core number of the optical fibers housed in one of the slot grooves is 100 or more.

3. The optical fiber cable according to claim 1, wherein an outermost layer of the slot rod is constituted by a resin having a Young's modulus of 1500 MPa or more at normal temperature.

4. The optical fiber cable according to claim 1, wherein a distance between centers of adjacent ones of the optical fibers is 0.20±0.03 mm.

* * * * *